July 6, 1965  R. H. S. IRVING  3,192,896
TIRE MASK
Filed Jan. 26, 1962
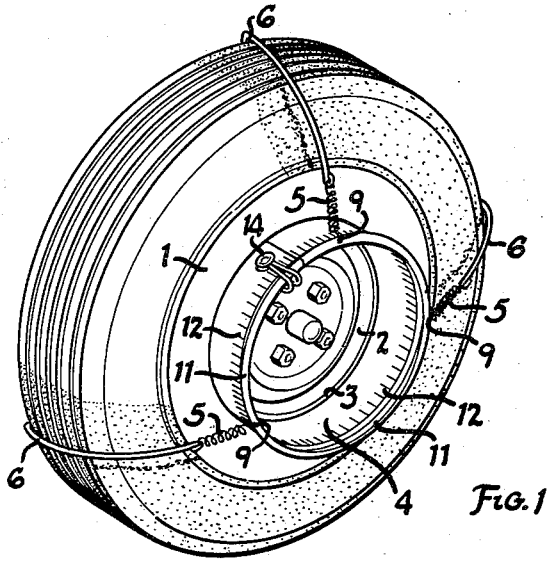
FIG. 1
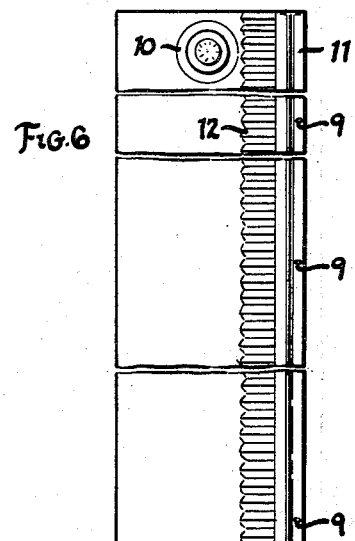
FIG. 6
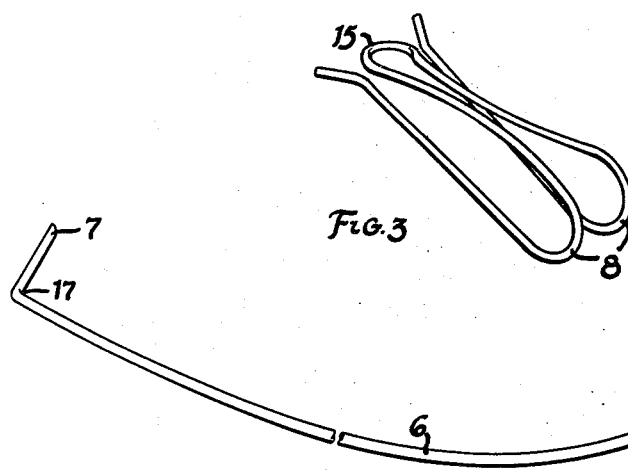
FIG. 3
FIG. 2
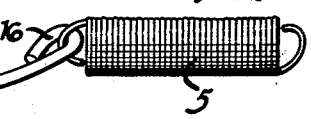
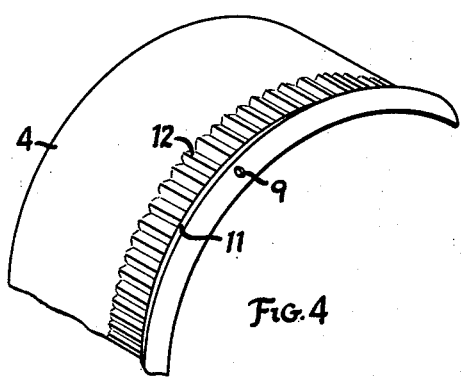
FIG. 4
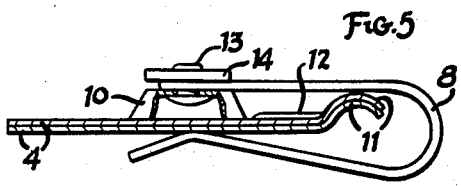
FIG. 5
INVENTOR.
REGINALD H. STERNS IRVING
BY
Wilson, Settle & McKinnon
ATTORNEYS 3,192,896
TIRE MASK
Reginald H. Sterns Irving, 8797 Kimberly Court,
Detroit 4, Mich.
Filed Jan. 26, 1962, Ser. No. 169,070
2 Claims. (Cl. 118—505)

This invention generally relates to a masking device and more particularly to a masking device for vehicle tires and wheels while the vehicle wheels are being painted without removal of the wheel from the vehicle or the tire from the wheel.

It is common practice to paint vehicle wheels without removing them from the vehicle or without removing the tires from the wheels. In painting, particularly in spray painting, it is difficult to prevent the paint from soiling the tire while painting the wheel. It is therefore necessary to provide a mask or shield for the tire to prevent the paint from getting on the tire when the wheel is painted.

Heretofore it has been necessary to mask off the tires with masking tape and paper, a laborious and time consuming task, or to apply a metal shield of various designs which is held in place by gripping the outer periphery of the rim edge of the wheel or the slots or apertures if any, in the wheel. These are also difficult to apply to many wheels and impossible to apply to a wheel which does not have any outwardly flared lip on its rim edge, or slots or apertures in itself.

It is therefore an object of this invention to provide a tire mask, which is simple in construction, easy to use, well adapted for its intended purposes and relatively inexpensive to manufacture.

Another object of this invention is to provide a tire mask which protects the tire from the paint applied to the wheel and one which the operator may apply to the tire without difficulty regardless of the shape or design of the rim edge of the wheel, and whether or not the wheel has slots or apertures. The device is adjustable to fit different diameters of wheels and different sizes of tires.

Still another object of the invention is to provide a tire mask which can be readily applied to any wheel on which a tire is mounted without requiring any lip or flange on the edge of the wheel rim to hold the tire mask in place.

A further object of this invention is to provide a tire mask which securely grips the tread or opposite side of the tire by means of two (2) or more, and preferably three (3), and henceforth shown and described as three (3), spring tensioned hooks in order to maintain itself in an applied and operative position.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 shows in perspective, a device constructed in accordance with the invention, mounted on a wheel and tire in operative position.

FIGURE 2 shows in side elevation the curved wire hook and extension spring which grips the tread or opposite side of the tire.

FIGURE 3 shows in perspective the compression clip spring which clamps together the overlapping ends of the device.

FIGURE 4 is a perspective of a fragmentary end of the device showing the strenghtening crimps and bead formed by an ordinary crimping and beading machine, common to the sheet metal worker's art.

FIGURE 5 is a side elevation of the section of the device at its overlapping ends, with the upset or recessed portion cut away to show the mounting rivet and washer for the compression clip spring, said spring being in an unnatural, distended position for clarity.

FIGURE 6 is a plan of a rectangular flat strip of sheet metal or other suitable material, showing three holes formed in one side of its greatest dimension and another hole formed in an upset or recessed portion at one end of its smallest dimension.

In carrying out the invention, referring now specifically to the drawing, there is provided a flat rectangular strip of sheet metal or any other material compatible with the purpose such as fibre glass and various other plastic or inorganic materials, but preferably of sheet metal, numeral 24, FIGURE 6, in which three holes have been formed at 9 to accommodate the fastening to of the curved wire hook and extension spring assembly shown in FIGURE 2, these holes being spaced approximately as follows, one (1) in the center near the edge of the longitudinal dimension of said strip and one (1) each near the same edge a distance from the center equal to one-third (⅓) or more of the total longitudinal dimension of said strip 24. A hole is also formed at 10 at the approximate center, near one end of said strip, the end being the smallest dimension of the rectangular strip. The hole is formed in the upset or recessed portion 10, FIGURE 5, to accommodate a rivet 13, and retaining washer 14, which attach a compression clip spring 8, also shown in FIGURE 3, to the device 4.

This flat strip of sheet metal 24, is then applied to and ran through an ordinary crimping and beading machine such as forms the crimps and bead in a piece of stovepipe, common to the sheet metal worker's art, and generally referred to in that trade as a "Pexto" crimper and beader or a "Niagara" crimper and beader. This machine is conventional and well known and is therefore not shown in the drawing. This machine forms the flat strip of sheet metal into overlapping unconnected circular ring 4 and imparts a strengthening bead 11 on the outer edge, in which edge holes 9 are located and also imparts crimps 12, inward of and adjacent to said bead. These crimps 12 project from one side of the strip and define a complementary recess in the other side of the strip to mesh with themselves in the overlapping area of the formed circular ring 4, being held in a meshed attitude by the clamping action of a compression clip spring 8, which is attached to the device 4, at 10 by any common fastening means such as a rivet 13 and washer 14 as shown. This rivet 13 passes through the hole provided in the upset or recessed portion 10 and the loop 15 provided in compression clip spring 8 and so attaches the compression clip spring 8, to the device 4. The upset or recessed portion 10 provides clearance for the head of the rivet 13. It will be seen now that the circumference of the overlapping circular ring 4 can be increased or decreased by decreasing or increasing the amount of overlap of said circular ring accordingly, and so held to any set circumference by the clamping action of the compression clip spring 8, holding the crimps 12 in mesh in the overlapping area. As the diameter increases or decreases in direct relation to the circumference, the device 4, can be adjusted to encompass the perimeter of the rim edge 3 of a wheel 2, on which a tire 1 is mounted and enable the operator to apply paint to the wheel 2 without getting the paint on the tire 1.

When the ends of strip 24 are clamped in overlapping relationship with each other by spring 8, the longitudinally extending strengthening bead 11 at one end of the strip is seated within the overlapped portion of the bead at the opposite end of the strip to lock the overlapped ends of the strip against movement relative to each other in a direction axially of the circular band. The meshing action between the crimps 12 in the overlapped region correspondingly retains the overlapped ends against movement circumferentially of the circular band, thus retaining the circular band at the desired diameter. Crimps 12 are closely spaced from each other to permit the diameter of the circular band to be adjusted with a desirable degree of precision.

The device is then, in application, securely attached to the tire 1, by means of three (3) extension springs 5, and three (3) curved wire hooks 6, which are assembled to the device 4, by engaging either end of the extension springs 5, in the holes 9 of the device 4, and the other end of the extension springs 5, in the closed loop 16, provided at one end of the curved wire hook 6. The other end of the curved wire hook 6, is bent at 17 to an included angle of ninety (90) degrees or less, in a plane with the curvature of said wire hook. As shown in FIGURE 2 the included angle is less than ninety (90) degrees and the bend 17 is preferably although not of necessity, made at a location from the sharpened point 7, equal to one-twelfth ($\frac{1}{12}$) of the total length of the curved wire hook 6. In application the sharpened points 7 of the curved wire hooks 6, are engaged with the surface of the tread or the side opposite to the device 4, of the tire 1, and so attach the device 4 to the tire 1, the device 4, then encompassing the rim edge 3, of the wheel 2. The sharpened points 7, of the curved wire hooks 6, are not shown in FIGURE 1 because of the perspective view of the drawing and the curved wire hook 6, attached to extension spring 5, engaged in hole 9, at the extreme right hand side of FIGURE 1 is hidden from view by the nature of the drawing.

In application the operator can adjust the device to engage, with the curved wire hooks 6, various sizes of tires 1, by the resilient stretching action of the extension springs 5. This resilient stretching action of the extension springs 5, also enables the operator to center the device 4, around the perimeter of the rim edge 3, of the wheel 2, even if there is no outward flared lip on the rim edge 3. This is done simply by moving the curved wire hooks 6, farther or less around and over the tire 1, and clockwise or counterclockwise about the circumference of tire 1, and thereby increasing or decreasing the stretch and direction of pull of extension springs 5, and by so doing centering the device 4, around the rim edge 3, of the wheel 2.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention as claimed.

Having thus completely and fully described the invention, what is now claimed as new is as follows:

1. In a paint spray tire mask for a vehicle wheel and tire assembly having an elongate rectangular member of flexible sheet material which is flat along one elongated edge and adapted to be flexed into a circular band of a selected diameter substantially corresponding to the outer diameter of the wheel by overlapping the opposite end portions of the member, and clamp means for clamping the overlapping end portions of the member against each other to maintain the band at the selected diameter; attachment means for mounting the band in position upon a wheel and tire assembly with said one edge of the band engaged with the side of the tire adjacent the periphery of the wheel with the band projecting axially from the side of the tire, said attachment means comprising a plurality of tension springs coupled at one end to said band at spaced points along the edge of the band remote from the tire, and hook means coupled to the opposite end of each tension spring engageable in the tread portion of the tire the attachment means extending radially outwardly from said band to retain the band in position upon the tire by resiliently biasing the one edge of the band axially against the side of the tire while leaving completely unobstructed the area circumscribed by the band.

2. A tire mask as defined in claim 1 wherein each of said hook means comprises a shank portion and a pointed tip portion, the tip portion being bent from the shank portion at an inclination such that the included angle between the tip and shank is less than 90°.

References Cited by the Examiner

UNITED STATES PATENTS

| | | | |
|---|---|---|---|
| 1,031,188 | 7/12 | McIvor Law | 24—23 |
| 1,052,028 | 2/13 | Appleton | 38—140 |
| 1,173,998 | 2/16 | Depew | 24—23 |
| 1,176,245 | 3/16 | Roberton | 38—140 |
| 2,081,666 | 5/37 | Gunn | 118—505 |
| 2,634,704 | 4/53 | Morrison | 118—505 |
| 2,821,130 | 1/58 | Hummel | 118—505 X |
| 2,954,752 | 10/60 | Hayward | 118—505 |
| 3,001,509 | 9/61 | Carpenter et al. | 118—505 X |
| 3,141,794 | 7/64 | Horner | 118—505 |

CHARLES A. WILLMUTH, *Primary Examiner.*

RICHARD D. NEVIUS, *Examiner.*